May 23, 1933.  G. C. SMITH  1,910,644
FLUID MOTOR
Filed Sept. 2, 1930
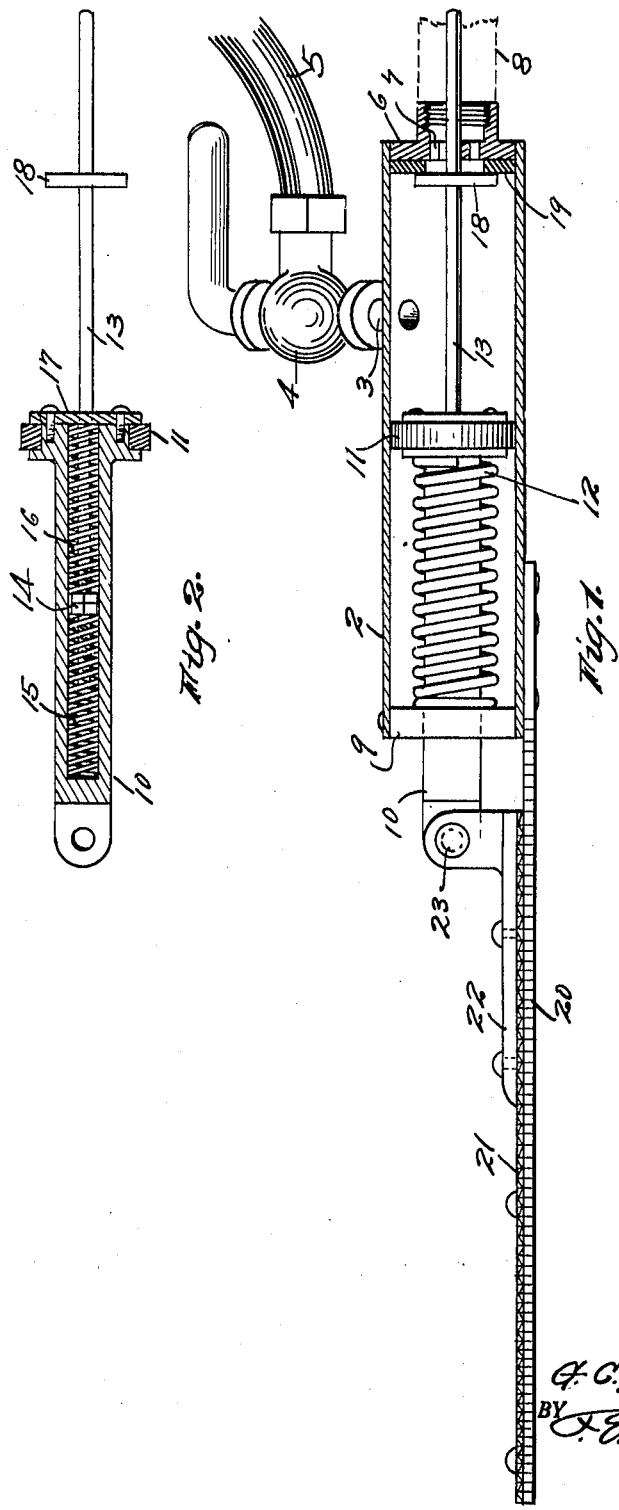
INVENTOR.
G. C. Smith;
BY F. E. Maynard
ATTORNEY Patented May 23, 1933

1,910,644

UNITED STATES PATENT OFFICE

GROVER C. SMITH, OF LOS ANGELES, CALIFORNIA

FLUID MOTOR

Application filed September 2, 1930. Serial No. 479,369.

This invention relates to fluid motors and more especially to hydraulic motors.

It is an object of the present invention to provide a highly efficient and simple prime mover of a type including a reciprocating piston and a differential valve device combined therewith, whereby to effect the exhaust of the motor fluid automatically in rapid intermittent actions.

A further object is to provide a combined shearing mechanism and fluid motor.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is an axial section of the motor as combined with blade devices of a clipper.

Figure 2 is an axial section of the motor piston and its automatic valve.

In its illustrated form, the invention includes a cylinder 2 to one side of which is connected a motive fluid inlet 3 controlled by a regulating valve 4; this being shown in the present case as connected to a garden hose 5 for the supply of water under available pressure to the motor.

One end of the cylinder is closed by an exhaust head 6, having a series of exhaust ports 7 from which may extend a drain line 8. The opposite end of the cylinder is provided with a guide bushing 9 for a piston rod 10, whose inner end carries a piston ring 11, snugly operating in the cylinder 2. The piston rod 10 is yieldingly thrust inward by a main spring 12, surrounding the piston rod.

The piston rod is hollow and receives the end of a valve rod 13, which is threaded to receive adjustable lock-nuts 14 normally held in intermediate position in the bore of the piston rod by a cushion spring 15, and a compression spring 16, bearing against a guide plate 17 fixed to the head of the piston rod 10.

On the valve rod 13 is fixed a disc 18, which is normally pressed to closing position against a valve seat 19 by action of the main spring 12 until a pressure is built up in the space between the piston 11 and the valve seat 19 great enough to repress the piston on the spring 12 and compress spring 16 sufficiently to cause the latter to pull the valve disc 18 away from its seat 19. As this occurs, the accumulated fluid from the inlet 3 will escape through the exhaust outlets 7 and because of the loss of pressure of the motive fluid, the valve 18 will be again seated and the main spring 12 will force the piston 11 inwardly until the valve 18, being closed, pressure will again accumulate and force the piston rod outward until the valve 18 is again open.

As an example of utility of this motor, a stationary clipper blade 20 is shown as fixed to the cylinder 2 in a position parallel to its axis and a reciprocating clipper blade 21 is fixed to a backbone piece 22, which is pivotally connected at 23 to the outer end of the piston end so as to be reciprocated thereby, so long as motive fluid is admitted to the motor.

What is claimed is:

A fluid pressure and spring motor including a cylinder, fluid inlet and outlet ports therefor, a piston rod working in one end of the cylinder and having a piston head, and a valve rod working in the opposite end of the cylinder and having a valve moving in the cylinder chamber to close the outlet ports, and double action cushion means connecting the valve rod to the piston so as to carry the valve rod with the piston substantially throughout its strokes back and forth, said means including a shoulder on the rod portion in the piston part and compressed springs seating in the piston part and on opposite sides of the rod shoulder.

GROVER C. SMITH.